April 9, 1929. G. M. LUDLOW 1,708,275
WEIGHING SCALE TRANSLATING MECHANISM
Original Filed March 27, 1926  2 Sheets-Sheet 1
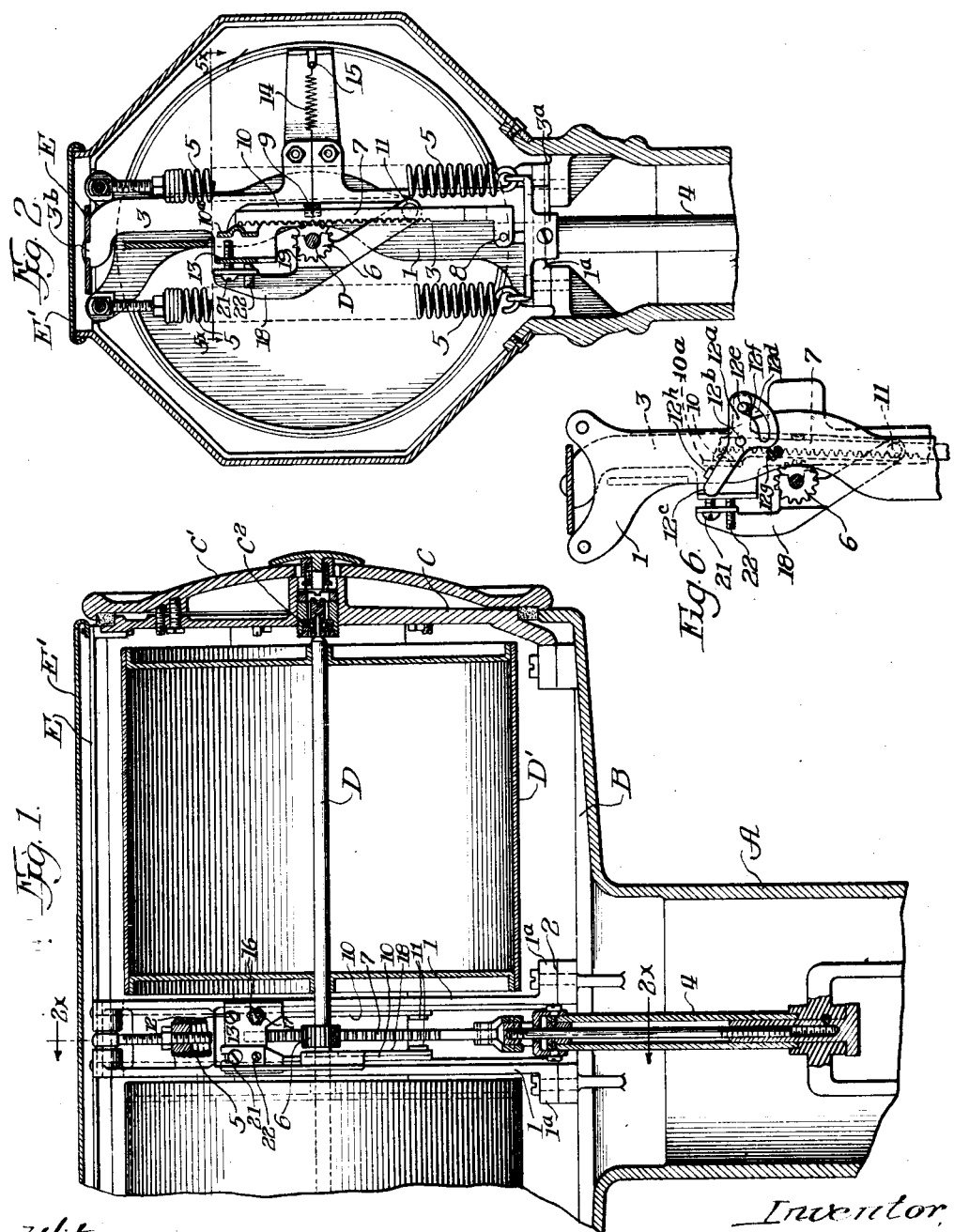

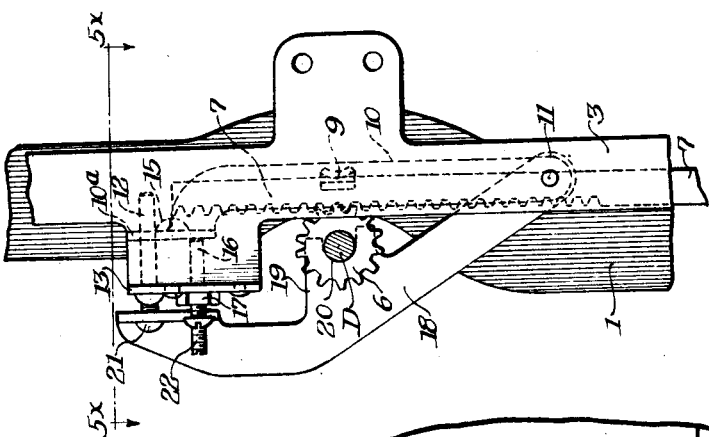

Patented Apr. 9, 1929.

1,708,275

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

WEIGHING-SCALE TRANSLATING MECHANISM.

Application filed March 27, 1926, Serial No. 97,824. Renewed August 22, 1928.

This invention relates to weighing scales of the class in which the load-transmitting element, usually in the form of a steelyard rod suspended from weighing springs, has its reciprocating movements registered by a rotary indicator, for instance, a cylindrical chart with which the load transmitting element is connected through means of a pinion in driving relation to the shaft of the chart, and a rack extending upwardly from the load-transmitting element and confined in a path of movement in which it meshes with the pinion by means of a guide adjustable to determine with exactness the approach of the rack to the pinion. In such scales it has been the practice, prior to the present invention, to control the movement of the transmitting member by means of a dash pot, and to provide the dash pot with means whereby the transmitting member may be locked against movement during shipment; also to make the rack bar guide releasable so as to avoid pressing the rack bar into mesh with the pinion during shipment. But no means was provided to facilitate locking off the rack bar from the pinion during shipment of the scale, and guarding against injury of the surfaces of the rack and pinion in case of shock, and as a consequence, while the parts were fully protected in shipment to the place of use, there was a possibility of injuring the parts by a shock or jolting in handling, resulting from transmission of stress from the rack to the pinion in case the transmitting member was left movable in the dash pot, or transmission of shock from the pinion to the rack resulting from springing of the chart shaft, which might occur even though the transmitting member were locked against movement in the dash pot.

One object of the present invention is to provide means for facilitating displacement of the rack bar and positively holding it away from the pinion during shipment and handling of the scale; also facilitating return of the rack to working position when demonstrating or installing the scale on the counter, thereby insuring against neglect of these precautions, besides saving the time of both the salesman and the merchant with whom he is dealing; also to insure return of the rack-bar to the exact position relatively to the pinion which the factory expert has selected for the rack bar before selling the scale. Accordingly, one feature of the present invention consists in providing means for positively setting the rack bar away from the pinion, as well as means for setting it up to the pinion at the will of the demonstrator; such means consisting preferably in a guide for the rack bar having a bearing in front as well as in rear of the bar, these bearings being preferably in vertical planes, spaced apart sufficiently to remain normally without substantial contact with the rack bar, but close enough to prevent the rack bar departing materially from its intended path of movement under abnormal influences; the guide in front of the rack bar serving the important function of positively holding the rack bar away from the pinion when adjusted for such effect during shipment. In the preferred embodiment of this part of the invention, the rack bar guide is moved in a direction to withdraw the rack from the pinion by means of a spring, and is moved in the opposite direction by means of a screw, a second screw adjustable in the direction of movement of the guide, and serving as a stop therefor, being set prior to shipment of the scale, so that when the scale is set up at its destination, it is merely necessary to draw the guide by the screw first named until arrested by the stop screw, in order to insure precise positioning of the rack relatively to the pinion.

In mounting rotary cylindrical charts in driven relation to translating mechanism of the kind herein referred to, it is customary to support the chart by introducing the ends of its shaft into suitably supported anti-friction bearings remote from the translating mechanism, and to mount the pinion of the translating mechanism, or some member driven thereby, directly upon the chart shaft at an intermediate point of the latter. But this arrangement, while very desirable for precision work of the kind required in a computing scale, leaves the chart shaft subject to deflection by its own inertia resulting from jolting or shocks encountered in the handling of the scale, or under stresses received from the rack bar and developed by jolting or sudden application of excessive load, any of which influences are liable to cause permanent deflection of the shaft or injurious impingement of the rack and pinion surfaces against one another.

Accordingly, another object of the present invention is to provide for the intermediate portion of the shaft of a rotary scale chart, a guard which, while normally out of frictional contact with the chart, will nevertheless assume such position relatively thereto as to become immediately available in the event of deflection of the shaft, whether caused by the inertia of the parts under shocks incurred in handling, or from sudden application of load through the rack bar; that is to say, will be so related to the shaft as to arrest the shaft before it can deflect to a point injuriously near its elastic limit. And it is an object of the preferred embodiment of this part of the invention to so arrange the guard that it can be accurately adjusted to assume the described relation to the shaft of any particular chart that may be introduced, and also may be readily withdrawn from its position adjacent to the shaft in order to permit removal of the chart from the scale. To these ends, further features of the invention consist in mounting, preferably upon the guide support, a guard member which is preferably a pivoted arm, a lug with a bearing fashioned therein and movable into embracing relation with the chart shaft adjacent the pinion of the translating device, means being provided for adjustably fixing this guard member so that its embracing bearing can be brought to a position where it will relieve the shaft from injurious deflection, but will, nevertheless, remain normally out of frictional contact with the shaft. The means for fixing the guard may consist of a screw or camming device, or other means drawing it toward the standard which supports the guard, and a set screw definitely adjusted to limit the movement of said guard; such fixing means being readily releasable to permit the guard to move out of the path of the chart shaft at times when the chart is to be removed or replaced.

Inasmuch as the steelyard rod or load-transmitting member is connected both with the weighing springs and the rack and pinion translating device, it has heretofore been the practice to mount both the rack bar guide and the weighing springs upon one and the same standard; but, while it is desirable to closely relate the support for the guide and the support for the springs, to keep them from relative displacement laterally, manufacturing considerations make it desirable to utilize independent supporting standards serving, respectively, for the weighing springs and the translating mechanism guide, but interrelating these two columns, as, for instance, by having one in embrace of the other so that they are held against relative lateral movement, and by screwing the lower ends of the guide and guard standards to the base on which the spring standard is supported, riveting the upper ends of the guard and guide standard to a cross bar of the chart housing, and riveting intermediate portions thereof to a spacing plate in which the adjusting means may be mounted.

In the accompanying drawings, in which the preferred embodiment of the several features of the invention is shown by way of illustration—

Figure 1 is a section of the upper portion of a rotary chart scale in a vertical plane of the chart shaft;

Figure 2 is a section on the line 2ˣ—2ˣ of Figure 1;

Figure 3 is a perspective view showing the assembly of the weighing spring standard and the guide and guard supporting standard;

Figure 4 is a side elevation of an intermediate portion of Figure 3;

Figure 5 is a horizontal section on the line 5ˣ—5ˣ of Figures 2 and 4; and

Figure 6 is a detail view showing a modified means for facilitating positive adjustment of the rack bar guide in opposite directions.

Referring to Figures 1 and 2, A represents the upstanding column of a scale housing, B the cross-head mounted thereon, C one of the end frames carrying separately formed end wall C' and anti-friction bearing C² that receives the shaft D of rotary cylindrical chart D'; and E the top bar within the cover plate E" of a form of rotary chart weighing scale, which, while constituting no element of limitation in the present invention, illustrates one type of scale to which the present invention is applicable.

1, 1 represent spaced upstanding members of a counter-balance or spring standard stepped at 2 upon the head B, and 3, 3, represent spaced upstanding members of a standard which is likewise stepped at 2, affording support for a rack bar guide and a chart shaft guard employed in sustaining relationship to translating mechanism through which movements are transmitted to the chart from a steelyard rod or loading member 4, which is suspended by a known arrangement of springs 5 on the standard 1. 6 represents a pinion mounted upon the shaft D of the rotary cylindrical chart D', and 7 represents a rack bar in driving relation to the pinion 6, which rack bar stands up vertically from the loading member 4 with which it has offset connection at 8, with the result that vertical movements of the loading member 4, governed by the weighing springs 5, are registered in the chart D' as is usual in a scale of this type.

In order to hold the rack 7 to its duty in relation to the pinion 6 but without resistance that might be reflected in the weighing results, it has been customary to locate in rear of such a rack bar, a guide bearing 9 which is preferably made of brass or other metal having relatively low frictional value when in contact with the rack bar; and in order that this bearing may be accurately positioned with relation to the rack bar 7 and hold the latter to its duty but with minimum frictional contact, the guide bearing has been mounted on a lever pivoted to the spring standard. According to the present invention, the guide bearing 9, as shown more clearly in Figures 3, 4, and 5, constitutes a bridge piece between a pair of spaced lever arms 10, respectively pivoted at 11, not upon the spring standard 1, but upon the separately formed members 3 of the guide and guard standard; said lever arms being connected at their upper ends by a spacing web 10$^a$ which receives an adjusting screw 12 seated in a cross plate 13 which constitutes a spacing member for the standard members 3. The lever arms 10 are normally under the tension of spring 14 anchored at 15, and the result is that by adjusting screw 12 (Figures 1, 3, 4 and 5) or the adjusting cam 12$^a$ (Figure 6) the guide bearing 9 may be caused to present the rack 7 in precisely proper relation to the pinion 6. The lever, consisting of the arms 10 and the connecting webs 10$^a$, further embodies a bearing 15 in front of the rack bar 7, thereby adapting the lever to positively displace the rack bar 7 rearwardly from its pinion 6 as the lever 10 swings rearwardly under the influence of spring 14 when the screw 12 is turned backwards. This positive displacement of the rack 7 is permitted by the pivotal connection 8, and it should be resorted to whenever the scale is being shipped or handled under conditions that are liable to cause injury to the precision surfaces. In order to predetermine the exact position to which the rack bar 7 is returned when the scale is to be restored to function, a stop screw 16, located immediately beneath the screw 12 and provided with a lock nut 17, is mounted in the cross plate 13 in the path of the lever web 10$^a$. By giving proper adjustment to the stop screw 16, for instance, at the time of selling the scale, the exact position of the rack 7 when the scale is put into use, can be insured.

In order that the chart shaft D may be protected from injurious deflection either under the inertia of the shaft itself with the chart and other loads which it has to sustain, or under thrust transmitted to it by the rack bar 7, resulting from shocks in handling, or resulting from the sudden transmission of an excessive load through the loading member 4, a guard lever 18 is mounted upon a pivot 11 which, for convenience, may be the pivot of one of the lever arms 10, and carries an intermediate lug 19 formed with a guard bearing 20 designed to approximately fit the shaft D and adapted to be brought into such relation to the shaft D by the swinging of the lever 18 upon its fulcrum 11, as will take vertical transverse as well as horizontal transverse loads imposed upon the shaft, and sufficient to deflect it from its true position.

That is to say, if the scale is dropped in handling or receives any load in directions approximating the vertical which would be liable to injure it, the guard bearing 20 will receive the shaft and check the movement. Or, if a load be transmitted through the rack bar 7, the vertical moment of such load will be met as just described, while the horizontal moment resulting from displacing thrust of the rack teeth upon the pinion teeth, will likewise be sustained by the guard bearing. In order to impart to the lever 18 and the guard bearing 20 precisely the adjustment desired, the upper free end of lever 18 is adjustably connected by screw 21 with the cross plate 13 of the guide and guard standard 3. Screw 21 admits of ready release of the upper end of the lever 18 whenever it becomes necessary to remove a chart from the scale, and the location of fulcrum 11 of said lever permits the lever to be swung downward entirely out of the way of the chart at the time of such removal. In order to insure return of the lever 18 and its guard bearing 20 accurately to predetermined position, the upper free end of lever 18 also carries a stop screw 22 which impinges against the cross plate 13 of the guard and guide standard.

Inasmuch as it is desirable for manufacturing reasons to use a standard for the rack bar guide and the chart shaft guard, separate and distinct from that which serves to support the counterbalance springs, nevertheless to keep these two standards in accurately related positions, the guide and guard standard, composed of spaced members 3, 3, is located in close lateral embrace with the spring standard 1, the lower deflected ends 3$^a$ of the former standard being caught beneath the attaching feet 1$^a$ of the latter standard, and secured by the same screws upon the steps 2; and the members 3 of the guide and guard standard are without restraint of vertical movement relatively to the spring standard 1, and are provided at their upper ends with riveting lugs 3$^b$ through means of which they are rigidly secured to the top rail E (see Figure 2) when used in a scale following in its general organization that which is herein selected for illustration.

As shown in the modification disclosed in Figure 6, the guide lever 10 may be adjusted to bring the rack into and out of mesh by means of a cam 12$^a$ fulcrumed at 12$^b$ upon the guide standard 3, having a controlling finger piece 12$^c$, and an eccentric slot 12$^d$ engaged with a pin 12$^e$ that is fixed in an extension 12$^f$ on one side of the arms of the lever 10; a set screw 12$^g$ in the path of the controlling arm 12$^c$ being adjustable to limit the throw of the cam in the direction to bring the rack into mesh and thereby determine with exactness the approach of the rack to the pinion; and a fixed stop 12$^h$, or the upper end of the cam slot 12$^d$ as may be desired, being employed for limiting the throw in the opposite direction. Such an organization of parts obviously provides means for engaging the rack in the direction of holding it into mesh as well as out of mesh with the pinion, and it is particularly convenient since it involves merely a throw of the arm 12c from one limit to the other in order to place the rack in position where the precision surfaces of the translating mechanism cannot be injured, and throw it to the predetermined limit in the other direction to bring the rack into accurate working relation to the pinion.

I claim:

1. In translating mechanism for weighing scales, intermeshing gear members including a member movable to bring it into and out of mesh, and a guide movably mounted independently of both said members positively engaging said movable gear member and displacing and withholding it from meshing position.

2. In translating mechanism for weighing scales, including a pinion and a rack movable into and out of mesh with said pinion, a guide having a bearing member in position to encounter the rack in a direction to withdraw the rack from the pinion, and means for positively moving said guide and holding it in a position to retain the rack out of mesh, said guide being movably mounted independently of the rack and the pinion.

3. In weighing scales, in combination with rack and pinion translating mechanism, a guide member, and guide bearings carried by said guide member and adapted to engage both the front and rear of the rack, said guide member being mounted independently of both said rack and said pinion and movable in a direction to force the rack into and out of mesh with the pinion, and having, as one limit of its movement, a position in which it positively holds the rack wholly out of mesh with the pinion.

4. In weighing scales, rack and pinion translating mechanism, guide bearings engaging, respectively, in rear and in front of the rack, a guide member mounted independently of both said rack and said pinion, and upon which said guide bearings are mounted, movable in a direction to force the rack through the medium of said guides into and out of mesh with the pinion, a spring having a fixed anchorage independent of the rack and pinion and said guide member and imparting movement to said guide member in one direction, and a screw controlling the movement of the guide member in opposition to said spring; said screw being adapted to locate said guide member in a position which holds the rack wholly out of mesh with the pinion.

5. In weighing scales, rack and pinion translating mechanism, a standard, a guide member pivotally mounted upon said standard and carrying guide bearings in position to impinge against the rear and front of the rack, said guide member being movable upon its pivot in a direction to force the rack into and out of mesh with the pinion, a spring acting upon said guide member to move it in a direction which withdraws the rack from the pinion, and a screw engaging said guide member and adapted to draw it in opposition to said spring in the direction to return the rack into mesh with the pinion.

6. In weighing scales, rack and pinion translating mechanism, a guide member carrying guide bearings in position to impinge, respectively, in rear and in front of the rack, said guide member being movable in a direction to force the rack into and out of mesh with the pinion, a screw for forcing the guide member in a direction to bring the rack into mesh with the pinion, and a stop screw in the path of the guide member and adjustable to arrest the guide member in a position which establishes a predetermined relation between the teeth of the rack and the pinion.

7. In weighing scales, in combination with rack and pinion translating mechanism, a guide member comprising a pair of pivotally mounted spaced lever arms, a web connecting said lever arms and determining the space between them, guide bearings located between said lever arms in position to engage respectively in rear and in front of the rack, and means coacting with said web to determine the position of the guide member.

8. In weighing scales, in combination with rack and pinion translating mechanism, a standard comprising spaced uprights, a pair of spaced lever arms respectively pivoted upon said uprights and having a spacing web between them, guide bearings mounted between said lever arms in position to engage respectively in rear and in front of the rack, and adjusting screws connecting said web with the standard for adjusting the lever arms and positioning the rack.

9. In weighing scales, in combination with rack and pinion translating mechanism, a standard comprising a pair of spaced uprights and a transverse connecting plate, a pair of lever arms pivotally mounted upon the respective uprights and having a connecting web, rack bar guides mounted between said lever arms in position to engage respectively in rear and front of the rack, and screws mounted in said web and said connecting plate for controlling the position of the rack.

10. In weighing scales, in combination with a rotary chart shaft, a guard member constructed with a guard bearing adapted to said shaft, said guard member being movable to bring said bearing into and out of guarding relation to said shaft.

11. In weighing scales, in combination with a chart shaft, a guard member constructed with a guard bearing adapted to said shaft and movable to bring said bearing into and out of guarding relation to said shaft, an adjusting screw adapted to fix the guard member in position, and a stop screw in the path of said guard member adjustable to predetermine the position at which the guard member is arrested.

12. In weighing scales, in combination with a chart shaft, a pivoted lever, a guard bearing carried by said lever and movable in the pivotal action of the lever into and out of guarding relation to the shaft, and means engaging the free end of the lever for determining the position of the said bearing relatively to the shaft.

13. In weighing scales, in combination with a chart shaft, a pivotally mounted guard lever having a lug with a guard bearing formed therein and positioned to embrace the shaft in the swinging movement of the lever, and a set screw for adjustably fixing the free end of said lever.

14. In weighing scales, the combination of a rotary chart and its shaft, rack and pinion translating mechanism for imparting rotation to said shaft, and a shaft guard having a bearing embracing said shaft adjacent to the pinion, said bearing being normally out of contact with said shaft but in position to arrest deflection of the shaft under excessive loads imposed upon the pinion.

15. In weighing scales, the combination of a rotary chart having a shaft, and rack and pinion translating mechanism for driving said shaft, an adjustable guide for the rack, an adjustable guard for the shaft, and a standard upon which both said guide and said guard are movably mounted.

16. In weighing scales, the combination of a rotary chart having a shaft and rack and pinion translating mechanism for driving said shaft, an adjustable guide for the rack, an adjustable guard for the shaft, and a standard upon which both said guide and said guard are movably mounted; said standard being constructed with a connecting plate carrying means for adjusting both said guide and said guard.

17. In weighing scales, balancing springs, a loading member supported by said springs and having connections through which it receives weighing movements, a rotary indicator, rack and pinion translating mechanism through which the loading member drives the indicator, a standard from which the springs are supported, and a standard carrying a guide for the rack of the translating mechanism; one of said standards embracing and sustaining the other standard.

18. In weighing scales, a standard of thermostatic material, weighing springs suspended from said standard, a loading member suspended from said springs, a rotary indicator, a rack and pinion translating connection between the loading member and the indicator, and a standard having bearings through which it guides an element of said translating connection; one of said standards laterally embracing and sustaining the other while permitting freedom of relative movement between the standards resulting from thermostatic action.

19. In weighing scales, a standard of cast thermostatic metal, a standard of plate metal laterally contacting with and sustained by the cast standard, weighing springs suspended from the cast standard, and rack and pinion indicator drive guided by said plate standard.

20. In weighing scales, a spring supporting standard, a drive rack guide standard comprising spaced uprights laterally supported by the spring supporting standard, and a top bar interengaged with the guide standard.

21. In weighing scales, a weighing spring standard comprising spaced uprights, rack and pinion translating mechanism located between said uprights, and a rack guide standard, comprising uprights located within the uprights of the spring standard and having means for spacing them apart, and a rack guide mounted on said guide standard and constructed to engage and develop the position of the rack.

Signed at Chicago, Illinois, this 22nd day of March, 1926.

GEORGE M. LUDLOW.